United States Patent
Shuck (10) Patent No.: US 11,167,348 B2
(45) Date of Patent: Nov. 9, 2021

(54) JOINING METAL OR ALLOY COMPONENTS USING ELECTRIC CURRENT

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 300 days.

(21) Appl. No.: 16/019,403

(22) Filed: Jun. 26, 2018

(65) Prior Publication Data

US 2019/0001427 A1 Jan. 3, 2019

Related U.S. Application Data

(60) Provisional application No. 62/526,274, filed on Jun. 28, 2017.

(51) Int. Cl.
*B22F 3/105* (2006.01)
*H01F 41/02* (2006.01)
(Continued)

(52) U.S. Cl.
CPC ............ *B22F 3/105* (2013.01); *B23K 9/0213* (2013.01); *B23K 9/091* (2013.01);
(Continued)

(58) Field of Classification Search
CPC ....... B23K 11/08; B23K 11/002; B23K 11/34; B23K 11/115; B23K 1/0018; B23K 1/19;
(Continued)

(56) References Cited

U.S. PATENT DOCUMENTS

| 2,247,370 A | 7/1941 | Goetzel |
| 3,241,956 A | 3/1966 | Inoue |

(Continued)

FOREIGN PATENT DOCUMENTS

| JP | 61115687 A | * | 6/1986 | ............. B23K 11/16 |
| JP | H10180463 A | | 7/1998 | |

OTHER PUBLICATIONS

Office Action from U.S. Appl. No. 16/019,352, dated Oct. 15, 2020, 10 pp.

(Continued)

*Primary Examiner* — John J Norton
(74) *Attorney, Agent, or Firm* — Shumaker & Sieffert, P.A.

(57) ABSTRACT

A system may include a current source; a first metal or alloy component with a first major surface electrically coupled to the current source; a second metal or alloy component with a second major surface electrically coupled in series to the first component and the current source via an external electrical conductor, where the first and second major surfaces are positioned adjacent to each other to define a joint region; a metal or alloy powder disposed in at least a portion of the joint region; and a controller. The controller may be configured to cause the current source to output an alternating current that conducts through the first component and the second component to induce magnetic eddy currents, magnetic hysteresis, or both within at least a portion of the metal or alloy powder disposed in at least the first portion of the joint region.

12 Claims, 5 Drawing Sheets

(51) Int. Cl.
*H05B 3/60* (2006.01)
*H05B 3/00* (2006.01)
*B23K 9/02* (2006.01)
*B23K 9/09* (2006.01)
*B22F 5/04* (2006.01)
*B22F 5/00* (2006.01)
*C22C 1/04* (2006.01)

(52) U.S. Cl.
CPC ....... *H01F 41/0253* (2013.01); *H05B 3/0004* (2013.01); *H05B 3/60* (2013.01); *B22F 5/009* (2013.01); *B22F 5/04* (2013.01); *B22F 2003/1051* (2013.01); *B22F 2999/00* (2013.01); *C22C 1/0433* (2013.01)

(58) Field of Classification Search
CPC ...... B23K 1/206; B23K 1/0004; B23K 9/091; B23K 9/0213; B23K 2101/001; B23K 13/01; B23K 13/02; B23K 13/043; H05B 3/60; H05B 3/0004; B22F 3/105; B22F 2999/00; B22F 5/009; B22F 7/062; B22F 7/064; B22F 7/08; B22F 2003/1052; B22F 2003/1053; B32B 37/06; B32B 37/065
USPC ...................................... 419/8, 9; 228/248.1
See application file for complete search history.

(56) References Cited

U.S. PATENT DOCUMENTS

| | | | |
|---|---|---|---|
| 3,250,892 A | 5/1966 | Inoue | |
| 3,387,972 A | 6/1968 | Inoue | |
| 3,654,422 A * | 4/1972 | Erlandson | B23K 11/241 219/81 |
| 4,969,968 A | 11/1990 | Leatherman | |
| 5,565,117 A * | 10/1996 | Iwasa | B23K 23/00 219/117.1 |
| 6,089,444 A | 7/2000 | Slattery et al. | |
| 6,384,365 B1 | 5/2002 | Seth et al. | |
| 9,221,101 B2 | 12/2015 | Hugot et al. | |
| 2011/0303655 A1* | 12/2011 | Kanai | B23K 11/241 219/660 |
| 2012/0315493 A1* | 12/2012 | Baker | C04B 37/028 428/457 |
| 2016/0158840 A1 | 6/2016 | Cologna et al. | |

OTHER PUBLICATIONS

Office Action from U.S. Appl. No. 16/019,352 dated Mar. 11, 2021, 11 pgs.
Response to Office Action dated Oct. 15, 2020, from U.S. Appl. No. 16/019,352, filed Jan. 15, 2021, 8 pp.
Response to Office Action from U.S. Appl. No. 16/019,352 dated Mar. 11, 2021, filed Jun. 2, 2021, 7 pgs.
Notice of Allowance from U.S. Appl. No. 16/019,352 dated Jun. 10, 2021, 8 pgs.

* cited by examiner

JOINING METAL OR ALLOY COMPONENTS USING ELECTRIC CURRENT

This application claims the benefit of U.S. Provisional Application No. 62/526,274, filed Jun. 28, 2017, which is incorporated herein by reference in its entirety.

TECHNICAL FIELD

The disclosure relates to systems and techniques for joining metal or alloy components using electric current.

BACKGROUND

Some articles formed from metals or alloys are more easily formed out of multiple parts. For example, the geometry of the article may be complex and may be difficult to form from a single piece of metal or alloy. Joining multiple metal or alloy parts may be difficult, however, as some joining techniques may use joining material that may have undesirable mechanical properties, chemical properties, or both; require long joining cycle times; or require prolonged exposure to elevated temperatures for joining.

SUMMARY

In some examples, the disclosure describes a system that includes a current source; a first component including a first metal or alloy and a first major surface, where the first component is electrically coupled to the current source; a second component including a second metal or alloy and a second major surface, where the second component is electrically coupled to the current source; a metal or alloy powder; and a controller. The first major surface of the first component and the second major surface of the second component may be positioned adjacent to each other to define a joint region between adjacent portions of the first major surface of the first component and the second major surface of the second component. The metal or alloy powder may be disposed in at least a portion of the joint region. The controller may be configured to cause the current source to output an electric current that passes from the first component, through at least a portion of the metal or alloy powder, into the second component. The electric current may be an alternating current. A frequency of the alternating current may be configured to cause standing electromagnetic waves within at least a portion of the particles of the metal or alloy powder.

In some examples, the disclosure describes a method that may include positioning a first component including a first metal or alloy and a first major surface, where the first component is electrically coupled to a current source, adjacent to a second component including a second metal or alloy and a second major surface, where the second component is electrically coupled to the current source, to define a joint region between adjacent portions of the first major surface of the first component and the second major surface of the second component. The method also may include introducing a metal or alloy powder to at least a portion of the joint region. The method also may include controlling, by a controller, a current source to cause the current source to output an electric current that passes from the first component, through at least a portion of the metal or alloy powder, into the second component. The electric current may be an alternating current. A frequency of the alternating current may be configured to cause standing electromagnetic waves within at least a portion of the particles of the metal or alloy powder.

In some examples, the disclosure describes a controller that may be configured to pass an electric current from a current source into a first component, through at least a portion of a metal or alloy powder, into a second component. The first component may include a first metal or alloy and a first major surface, and may be electrically coupled to the current source. The second component may include a second metal or alloy and a second major surface, and may be electrically coupled to the current source. The first major surface of the first component and the second major surface of the second component may be positioned adjacent to each other to define a joint region between adjacent portions of the first major surface of the first component and the second major surface of the second component. The metal or alloy powder may be disposed in at least a portion of the joint region. The electric current may be an alternating current. A frequency of the alternating current may be configured to cause standing electromagnetic waves within at least a portion of the particles of the metal or alloy powder.

The details of one or more examples are set forth in the accompanying drawings and the description below. Other features, objects, and advantages will be apparent from the description and drawings, and from the claims.

DETAILED DESCRIPTION

The disclosure describes systems and techniques for joining first and second metal or alloy components using a metal or alloy powder by passing an electric current through the powder. In some examples, a system for joining first and second metal or alloy components using a metal or alloy powder may include a current source electrically coupled to the first and second components and a controller. The first and second metal components may be positioned adjacent to each other to define a joint region. The metal or alloy powder may be disposed in at least a portion of the joint region and may include a metal or alloy with desirable mechanical properties, chemical properties, or both. For example, the metal or alloy powder may include reduced amounts of melting point depressants (e.g., B, Si, or the like) compared to braze alloys. Hence, joints formed using the metal or alloy powder may have a higher melting temperature than joints formed using braze alloys, may have reduced brittleness compared to joints formed using braze alloys, or both.

The controller may be configured to cause the current source to output an electric current that passes from the first component, through at least a portion of the metal or alloy powder, and into the second component. The electric current passing through the metal or alloy powder may heat and soften or melt at least a portion of the powder. The powder then may be allowed to cool and solidify. In this way, the systems and techniques of this disclosure may allow joining of metal or alloy components with a joining material having desirable mechanical properties, chemical properties, or both, without exposing the metal or alloy components to undesirably long cycle times or prolonged, elevated temperatures. Thus, the systems and techniques of the disclosure may allow joining of metal or alloy components in a reduced amount of time, with joints that have improved mechanical strength and thermal stability, and with reduced impact on the microstructure of the metal or alloy components being joined.

Figure 1:
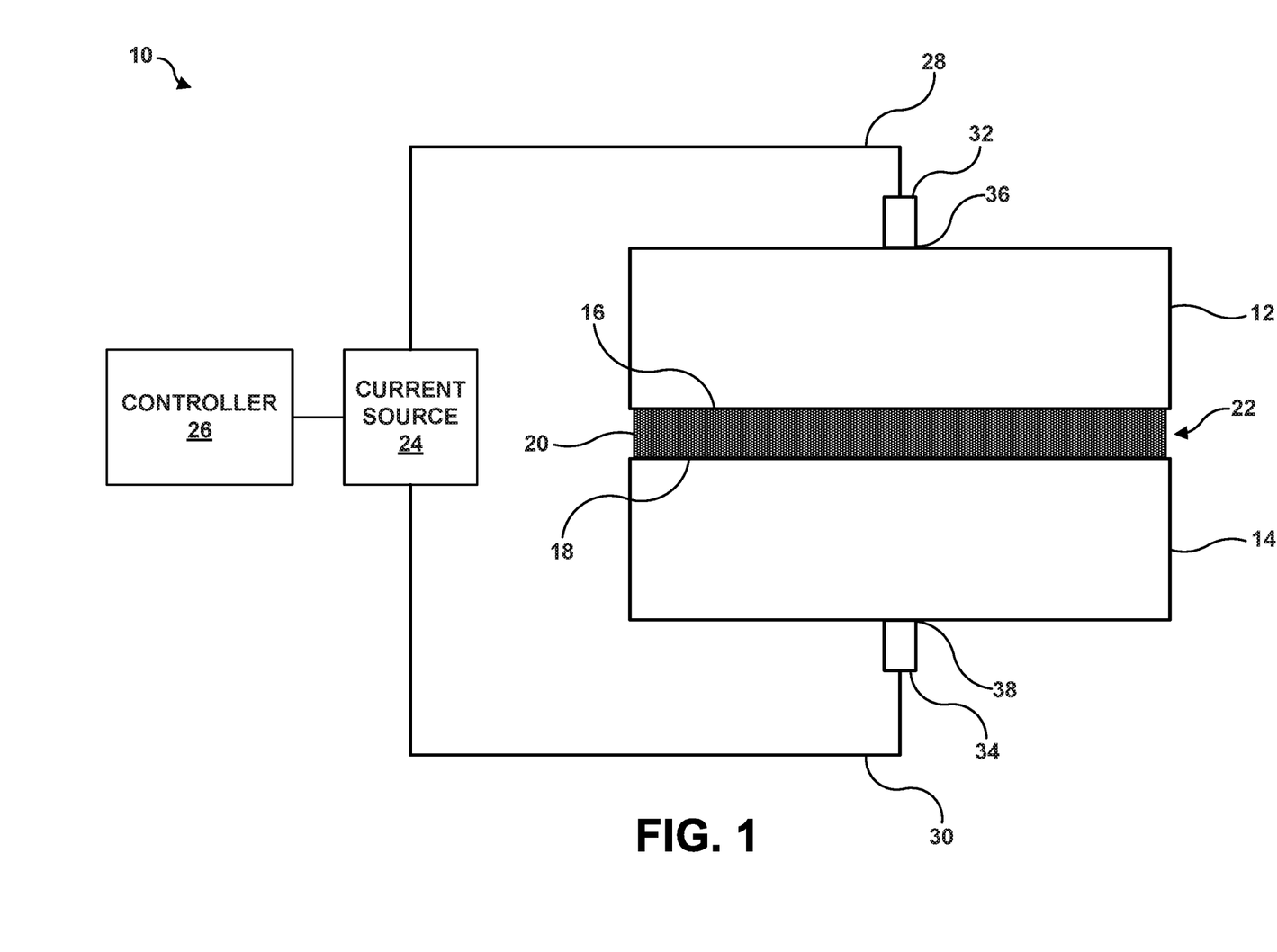
FIG. 1 is a conceptual and schematic diagram illustrating an example system for joining a first metal or alloy component and a second metal or alloy component using a metal or alloy powder by passing electric current through the powder.

FIG. 1 is a conceptual and schematic diagram illustrating an example system 10 for joining a first component 12 and a second component 14 using a powder 20 by passing electric current through powder 20. In some examples, first component 12 and second component 14 may be joined to form an article or a portion of an article that is part of a high temperature mechanical system. For example, first component 12 and second component 14 may be joined to form a component of a gas turbine engine, such as a gas turbine engine blade, gas turbine engine vane, blade track, combustor liner, or the like.

Each of first component 12 and second component 14 may include a metal or alloy. In some examples, each of first component 12 and second component 14 may include a Ni—, Co—, Fe-based superalloy, or Ti-based alloy, or the like. The alloy may include other additive elements to alter its mechanical and chemical properties, such as toughness, hardness, temperature stability, corrosion resistance, oxidation resistance, and the like. Any useful alloy may be utilized in first component 12 and second component 14, including, for example, Ni-based alloys available from Martin-Marietta Corp., Bethesda, Md., under the trade designation MAR-M246, MAR-M247; Ni-based alloys available from Cannon-Muskegon Corp., Muskegon, Mich., under the trade designations CMSX-3, CMSX-4, CMSX-10, and CM-186; Co-based alloys available from Martin-Marietta Corp., Bethesda, Md., under the trade designation MAR-M509; and the like. The compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |

TABLE 1-continued

|    | CMSX-3 (wt. %) | CMSX-4 (wt. %) |
|----|----------------|----------------|
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re | —              | 3              |
| Ni | Balance        | Balance        |

In some examples, first component 12 and second component 14 include substantially the same (e.g., the same or nearly the same) metal or alloy. In other examples, first component 12 and second component 14 include different metals or alloys. For example, first component 12 may include a first alloy and second component 14 may include a second, different alloy, the first alloy providing a greater mechanical strength compared to the second alloy, and the second alloy providing a greater thermal resistance compared to the first alloy. In this way, the first component 12 and the second component 14 may exhibit different mechanical properties, chemical properties, or both.

Each of first component 12 and second component 14 may be made using at least one of casting, forging, powder metallurgy, or additive manufacturing. In some examples, first component 12 and second component 14 are made using the same process, while in other examples, first component 12 and second component 14 are made using different processes.

Although FIG. 1 illustrates first component 12 and second component 14 as each defining a simple, substantially rectangular geometry, in other examples, first component 12, second component 14, or both may define a more complex geometry, including simple or complex curves, overhangs, undercuts, internal cavities, or the like.

First component 12 defines at least one joint surface 16. Similarly, second component 14 defines at least one joint surface 18. In some examples, joint surfaces 16 and 18 may define complementary shapes. FIG. 1 illustrates joint surfaces 16 and 18 as substantially flat surfaces. In other examples, joint surfaces 16 and 18 may define other, more complex complementary shapes, including, for example, simple or complex curves, overhangs, undercuts, apertures, annuluses, or the like.

First component 12 and second component 14 are positioned such that joint surfaces 16 and 18 are adjacent to each other and define a joint region 22. Joint region 22 may include any kind of simple or complex joint, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, a splice joint, or the like. Consequently, joint surfaces 16 and 18 may have any corresponding geometries to define the surfaces of the joint region 22. For example, for a mortise and tenon joint, first component 12 may define a mortise (a cavity) and second component 14 may define a tenon (a projection that inserts into the mortise). As another example, for a splice joint, first component 12 may define a half lap, a bevel lap, or the like, and second component 14 may define a complementary half lap, bevel lap, or the like.

In some examples, although not shown in FIG. 1, system 10 may include a clamp, press, or other mechanism for exerting pressure between first joint surface 16 and second joint surface 18 during the joining technique. The pressure between first joint surface 16 and second joint surface 18 may facilitate formation of the joint, for example, by helping to at least one of maintain the gap of joint region 22, promote flow of powder 20, or evacuate any gases or porosity in powder 20, which reduces porosity in the joint.

Disposed in joint region 22 is a powder 20. Powder 20 may include a metal or alloy. For example, powder 20 may include may include a Ni—, Co—, or Fe-based superalloy powder, or Ti-based alloy powder, or the like. The alloy of powder 20 may include other additive elements to alter mechanical properties, chemical properties, or both, of the alloy, such as toughness, hardness, temperature stability, corrosion resistance, oxidation resistance, or the like. Any useful alloy powder may be utilized in powder 20. For example, powder 20 may possess sufficient mechanical strength and high temperature oxidation resistance to be used in a component in a gas turbine engine. In some examples, powder 20 may include alloys such as, for example, Inconel 718, Rene 88, Udimet 720, or the like, or elemental metals such as, for example, titanium, vanadium, zirconium, or the like.

In some examples, powder 20 may include substantially the same composition as one or both of first component 12 or second component 14, or a composition that includes a blend of the composition of first component 12 and the composition of second component 14 (e.g., in examples in which first component 12 and second component 14 are formed of different alloys). Selecting a composition of powder 20 that is substantially the same as the composition of first component 12, second component 14, or both may improve bonding to the respective component. Selecting a composition of powder 20 that is a blend of the composition of first component 12 and second component 14 may improve bonding to both components, e.g., compared to a dissimilar composition of powder 20.

In some examples, powder 20 may be substantially free of a melting point depressant. For example, powder 20 may be substantially free of boron, silicon, or both. Selecting a composition of powder 20 that is substantially free of boron, silicon, or both may improve the mechanical properties, chemical properties, or both, of the joint.

In some examples, metal or alloy powder 20 may have a selected powder mesh size, and may be produced by induction melting the metal or alloy, respectively, in vacuum or an argon atmosphere, followed by argon gas atomization. Each individual powder component used in powder 20 may be analyzed to confirm the particle size and chemical composition.

In some examples, joint region 22 may define a joint thickness (e.g., the gap between joint surface 16 of first component 12 and joint surface 18 of second component 14 in a direction normal to joint surfaces 16 and 18). In some example, the joint thickness may be substantially similar (e.g., the same or nearly the same) across the joint area (e.g., the surface area defined by one or both of joint surfaces 16 and 18). In other examples, the joint thickness may differ across the joint area. In some examples, the joint thickness may be less than or equal to about 127 micrometers (about 0.005 inch). In some examples, the joint thickness may define a thinner thickness, such as about 51 micrometers (about 0.002 inch). In other examples, joint thickness may define a greater thickness, such as up to about 1524 micrometers (about 0.060 inch), or about 1016 micrometers (about 0.040 inch).

By utilizing powder 20, metals or alloys with desirable mechanical properties and/or chemical properties (e.g., high temperature oxidation resistance, tensile strength, high temperature creep resistance, thermal cycling fatigue resistance, or the like) may be utilized in a joining technique to join first component 12 and second component 14. The resulting joint may possess sufficient mechanical properties and/or chemical properties to be utilized in a high temperature mechanical system, such as a component in a gas turbine engine. For example, powder 20 may include reduced amounts of melting point depressants (e.g., B, Si, or the like) compared to braze alloys. Hence, joints formed using powder 20 may have a higher melting temperature than joints formed using braze alloys, may have reduced brittleness compared to joints formed using braze alloys, or both. In this way, powder 20 may facilitate joining components used in a high temperature mechanical system, which may allow formation of an article from multiple, smaller components, easing, or reducing the cost of manufacturing the article.

Current source 24 may be electrically coupled to first component 12 by first connection 28 and second component 14 by second connection 30. First and second connections 28 and 30 may include any suitable material for conducting electric current from current source 24 to first component 12 or from second component 14 to current source 24 (e.g., to ground). For example, first and second connections 28 and 30 may include a conductive metal, such as, for example, copper.

In some examples, first and second connections 28 and 30 may include first and second electrodes 32 and 34, respectively. First and second electrodes 32 and 34 may include any suitable material for transmitting electric current from first connection 28 to first component 12 or from second component 14 to second connection 30. For example, the first and second electrodes 28 and 30 may include non-consumable electrodes, such as, for example, carbon; metals such as, for example, copper, silver, nickel, or the like; or alloys of such materials; or the like.

In some examples, at least one of first or second electrode 32 or 34 may be configured to pass the electric current through a surface area greater than about 16 square millimeters ($mm^2$) on first joint surface 16, second joint surface 18, or both. For example, at least one of first or second electrode 32 or 34 may include first or second tip 36 or 38 having a surface area greater than about 16 $mm^2$, such as, for example, greater than about 25 $mm^2$, greater than about 100 $mm^2$, or greater than about 1000 $mm^2$. In some examples, increasing the surface area of first or second tip 36 or 38 may require increasing the amperage delivered by current source 24. In this way, system 10 may pass electric current through a region of powder 20 having a surface area greater than about 16 $mm^2$ to enable formation of larger continuous joints compared to other joining techniques, such as, for example, spot welding. This may allow the joint to have increased mechanical strength, e.g., due to increased joining area, may reduce a time used to join first and second components 12 and 14, may allow the production of larger and/or less expensive components by joining shapes in an additive manner, making the starting shape near-net shape, or the like.

In some examples, first and second electrodes 32 and 34 may be configured to selectively and releasably electrically couple to first component 12 and second component 14, respectively. For example, positioning of first and second electrodes 32 and 34 may be controlled manually or by controller 26 in an automated process, e.g., using robotic arms. In this way, system 10 may control the position of electric current that passes through powder 20 such that system 10 may be configured to pass electric current through powder 20 in multiple locations in rapid succession to join areas larger than the area through which electric current may pass in a single location of first and second electrodes 32 and 34.

Current source 24 may include any suitable current type. For example, current source 24 may include an alternating current source or a direct current source. For brevity, the flow of electrons from current source 24 is described as originating from current source 24 and flowing into first component 12, through powder 20, into second component 14, and back to current source 24 (e.g., to ground). Other paths for the flow of electrons are contemplated and are not outside of the scope of the disclose subject matter.

Current source 24 may be configured to controllably output an electric current of any suitable power, voltage, and/or amperage. For example, current source 24 may be configured to output a frequency, power, voltage, and/or amperage sufficient to soften or melt at least a portion of powder 20. In some examples, current source 24 may include a switch or another current interrupter device to interrupt the flow of electrons from current source 24 to first component 12. In this way, the flow of electrons may be turned on and off. In some examples, current source 24 may include a voltage controller and/or an amperage controller. In this way, the output power level of current source 24 may be controlled. In some examples, current source 24 may include a frequency converter and/or a waveform generator. In this way, the output frequency and waveform of current source 24 may be controlled. For example, current source 24 may be configured to output direct current in a pulsed waveform of interleaved on and off periods.

Controller 26 may be configured to cause current source 24 to output an electric current that passes from first component 12, through at least a portion of powder 20, into second component 14. In some examples, controller 26 may be configured to control the power level output from current source 24. For example, controller 26 may control a voltage output and/or an amperage output from current source 24 to first component 12. In some examples, controller 26 may apply to powder 20 electric current with a power sufficient to soften or melt at least a portion of powder 20.

In some examples, controller 26 may be configured to control a length of time current is applied to powder 20. For example, controller 26 may control a switch or other device to interrupt the flow of electrons from current source 24 to first component 12. In some examples, controller 26 may apply electric current to powder 20 for a length of time in the range of 1 millisecond to 60 minutes. In some examples, the length of time electric current is applied to powder 20 may be based on the composition of powder 20, the joint thickness, the composition of first or second components 12 and 14, the desired heating and cooling rate, or the power, voltage, and/or amperage of current source 24.

In the example of current source 24 that includes an alternating current source, current source 24 may operate at any suitable frequency. For example, current source 24 that includes an alternating current source may operate at between about 1 hertz (Hz) to about 1 THz, for example, between about 1 MHz to about 300 GHz or between about 100 MHz to about 10 GHz. In some examples, controller 26 may be configured to control a frequency or waveform of the current output from current source 24. For example, controller 26 may control a waveform generator and/or a frequency converter. A frequency converter may be used to control the frequency of an alternative current output from current source 24. A waveform generator may be used to control the waveform (e.g., electromagnetic wave shape) of the alternating current output from current source 24. The waveform may be sinusoidal, square, sawtooth-shaped, or more complex to achieve the desired heating effect.

In some examples, the frequency of the alternating current may be configured to cause standing electromagnetic waves within at least a portion of the particles of powder 20.

In some examples, the average particle size of powder 20 may be selected to provide desirable mechanical properties, chemical properties, or both, during heating. For example, the average particle size of powder 20 may be selected to heat faster at a certain frequency. In other example, the frequency can be selected to heat powder 20 having a particular average particle size more quickly than a powder 20 having a different average particle size.

In some example, the powder packing density may affect electrical conductivity of powder 20. For example, a more densely packed powder may have a greater electrical conductivity compared to a less densely packed powder. In some examples, the electrical conductivity of powder 20 may affect the rate at which powder 20 is heated.

In some examples, powder 20 may have a greater electrical resistivity compared to first component 12 and second component 14. In examples in which powder 20 has a greater electrical resistivity than first component 12 and second component 14, resistive heating may be at least partially restricted to joint region 22. In other examples in which powder 20 has a greater electrical resistivity than first component 12 and second component 14, resistive heating may be substantially restricted to joint region 22.

In this way, system 10 may be used to produce a joint having desirable mechanical and chemical properties without exposing first or second components 12 and 14 to undesirably long cycle times or prolonged, elevated temperatures. For example, selection of powder 20 may include a metal or alloy with desirable mechanical properties, chemical properties, or both, e.g., powder 20 may include reduced amounts of melting point depressants (e.g., B, Si, or the like) compared to braze alloys, to produce a joint with a higher melting temperature, reduced brittleness, or both, compared to joints formed using braze alloys or brazing techniques. As another example, using an alternating current that produces resonating or standing electromagnetic waves in at least a portion of powder 20 to soften or melt at least a portion of powder 20 may allow joining of first and second components 12 and 14 using powder 20 in a reduced amount of time, the resulting joint having improved mechanical strength and thermal stability, and with reduced impact on the microstructure of first and second components 12 and 14.

Figure 2:
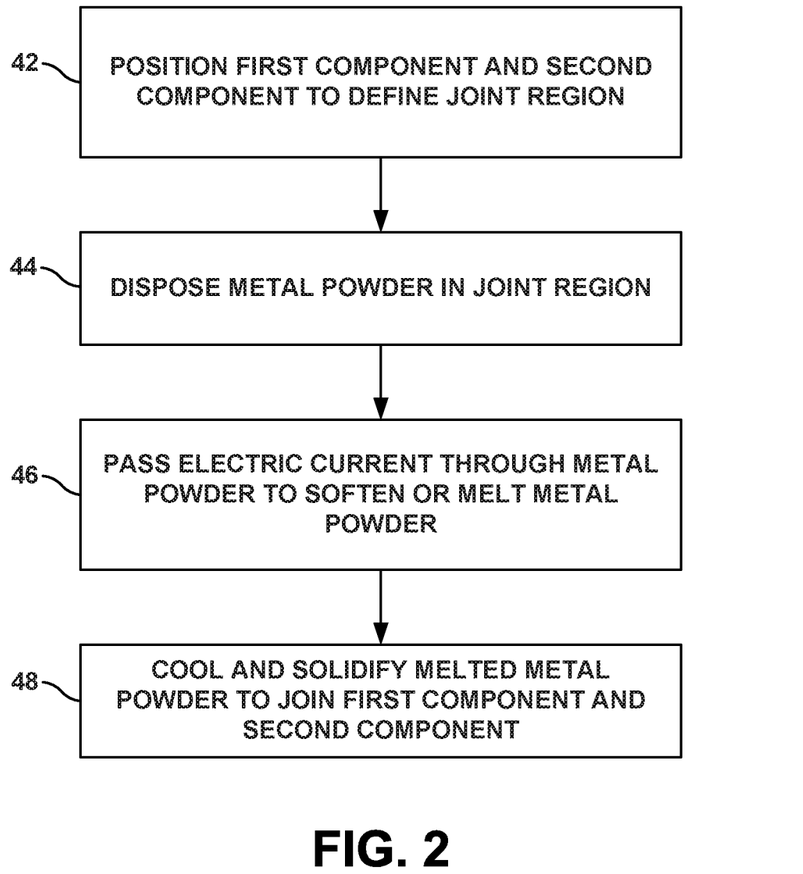
FIG. 2 is a flow diagram illustrating an example technique for joining a first metal or alloy component and a second metal or alloy component using a metal or alloy powder by passing electric current through the powder.

FIG. 2 is a flow diagram illustrating an example technique for joining a first metal or alloy component and a second metal or alloy component using a metal or alloy powder by passing electric current through the powder. The technique of FIG. 2 will be described with reference to system 10 of FIG. 1 for purposes of illustration only. It will be appreciated that the technique of FIG. 2 may be performed with a different system, or that system 10 may be used in a different joining technique.

Although not shown in FIG. 2, in some examples, prior to positioning first component 12 and second component 14 to define joint region 22 (42), at least one of first joint surface 16 and second joint surface 18 of first and second component 12 and 14, respectively, may be inspected and cleaned. Inspecting joint surfaces 16 and 18 may include, for example, visual inspection by a technician, automated inspection using a camera and image recognition and analysis software, e.g., implemented by controller 26. In response to determining that joint surfaces 16 or 18 or both include contaminants, joint surfaces 16 and 18 may be cleaned, e.g., using mechanical or chemical means. For example, joint surfaces 16 may be scrubbed, polished, exposed to a cleaning solvent or etchant, or the like. Cleaning first and second joint surfaces 16 and 18 may remove particles or other contaminants that may weaken the joint or react with the first or second components 12 or 14 or powder 20 during the joining technique or after joining (e.g., during thermal cycling or operation of the article including the joint). In this way, cleaned joint surfaces 16 and 18 may produce a stronger joint than uncleaned joint surfaces 16 and 18.

The technique of FIG. 2 includes positioning first and second components 12 and 14 to define joint region 22 (42). For example, as shown in FIG. 1, first and second components 12 and 14 may be positioned so that joint surfaces 16 and 18 are near each other. In some examples, controller 26 may be configured to control the positioning of first and second components 12 and 14. For example, controller 26 may control robotic components to position first and second components 12 and 14, may determine a position of first component 12 relative to second component 14 to define a desired joint region 22, or both. As described above, the geometry of joint region 22 may depend on the type of joint defined by joint surfaces 16 and 18 and may include, for example, a bridle joint, a butt joint, a scarf joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. As described above, joint region 22 may define a joint thickness that may be substantially similar or may differ across the joint area, e.g., the joint thickness may be between about 51 micrometers (about 0.002 inch) and about 1524 micrometers (about 0.060 inch). In this way, the technique of FIG. 2 may be used to control the size and shape of joint region 22.

The technique of FIG. 2 also includes disposing metal or alloy powder 20 in joint region 22 (44). For example, controller 26 may be configured to control a nozzle of a powder delivery system to dispose powder 20 in joint region 22. In some examples, controller 26 may be configured to position a nozzle of a powder delivery system in or near a portion of joint region 22 and controllably inject or spray powder 20 into a portion of joint region 22. In some examples, powder 20 may be disposed in joint region 22 such that powder 20 contacts substantially the entire surface area of joint surfaces 16 and 18 (e.g., the entire surface area or nearly the entire surface area). In other examples, powder 20 may be disposed in joint region 22 such that powder 20 contacts only a portion of the total surface area of one or both of joint surfaces 16 and 18. In some examples, a clamp, press, or other mechanism may be used to compress powder 20 between joint surfaces 16 and 18 to cause intimate contact between joint surfaces 16 and 18 and powder 20. In this way, the technique of FIG. 2 may be used to control the porosity and/or mechanical strength of the resulting joint.

The technique of FIG. 2 further includes passing electric current through powder 20 to soften or melt at least portion of powder 20 (46). For example, controller 26 may cause current source 24 to output an electric current, which is conducted to first component 12 via first connector 28 and first electrode 32. The electric current conducts through first component 12 to powder 20, and from powder to second component 14. In some examples, system 10 may be enclosed in a vacuum or substantially inert atmosphere while electric current is passed through powder 20 (e.g., an atmosphere including constituents that substantially do not react with first and second components 12 and 14 and powder 20 at the temperatures and pressures experienced by first and second components 12 and 14 and powder 20 during the technique). In some examples, passing electric current through powder 20 may heat at least a portion of powder 20. In some examples, the heating may be caused in whole or in part by resistive heating of at least a portion of the particles of powder 20. In other examples, the heating may be caused in whole or in part by the formation of standing electromagnetic waves in at least a portion of the particles of powder 20 or by an at least partial resonance of the alternating current in at least a portion of the particles of powder 20. In other examples, the heating may be caused by the combined effect of resistive heating and resonance of the alternating current in at least a portion of the particles of powder 20. In some examples, controller 26 may control the heating by, for example, by varying the voltage, amperage, frequency, waveform, or the like of the electric current. In this way, the technique of FIG. 2 may use electric current to controllably soften or melt at least a portion of powder 20.

In some examples, controller 26 may cause current source 24 to output an electric signal with a selected voltage, amperage, frequency, waveform, or the like to heat at least a portion of powder 20 to the melting point temperature of powder 20 or a temperature near or above the melting point temperature of powder 20. For example, heating at least a portion of powder 20 may include heating at least a portion of powder 20 to between about 188° C. and about 3500° C., or between about 600° C. and about 1600° C., or between about 900° C. and about 1550° C.

In some examples, controller 26 may cause current source 24 to output electric current for a selected duration. In this way, controller 26 may control the duration for which powder 20 is heated. For example, powder 20 may be heated to the melting point temperature of powder 20 (or near or above the melting point temperature of powder 20) for a time period in the range of about 0.001 seconds to about 60 minutes, for example, between about 1 second to 5 minutes or between about 10 seconds to about 2 minutes.

The technique of FIG. 2 further includes cooling softened or melted powder 20 to a temperature below the melting point temperature of powder 20, e.g., an ambient temperature, to form a solid and join first and second components 12 and 14 (48). For example, controller 26 may cause current source 24 to stop outputting electric current, thereby allowing softened or melted powder 20 to cool under ambient conditions. In some examples, controller 26 may cause current source 24 to gradually decrease electrical current to cool the joint at a controlled rate. In some examples, powder 20 may be cooled in a vacuum or under flowing inert gas to about 65° C. or less. In this way, the technique of FIG. 2 may be used to produce a joint, i.e., joint region 22 defined by joint surfaces 16 and 18 of first and second components, respectively, that includes the solidified metal or alloy of powder 20.

The technique of FIG. 2 may be used to produce a joint having desirable mechanical and chemical properties without exposing first or second components 12 and 14 to undesirably long cycle times or prolonged, elevated temperatures. For example, selection of powder 20 may include a metal or alloy with desirable mechanical properties, chemical properties, or both, e.g., powder 20 may include reduced amounts of melting point depressants (e.g., B, Si, or the like) compared to braze alloys, to produce a joint with a higher melting temperature and reduced brittleness compared to joints formed using braze alloys or brazing techniques. As another example, using an alternating current that produces resonating or standing electromagnetic waves in at least a portion of powder 20 to soften or melt at least a portion of powder 20 may allow joining of first and second components 12 and 14 using powder 20 in a reduced amount of time, the resulting joint having improved mechanical strength and thermal stability, and with reduced impact on the microstructure of first and second components 12 and 14.

Figure 3:
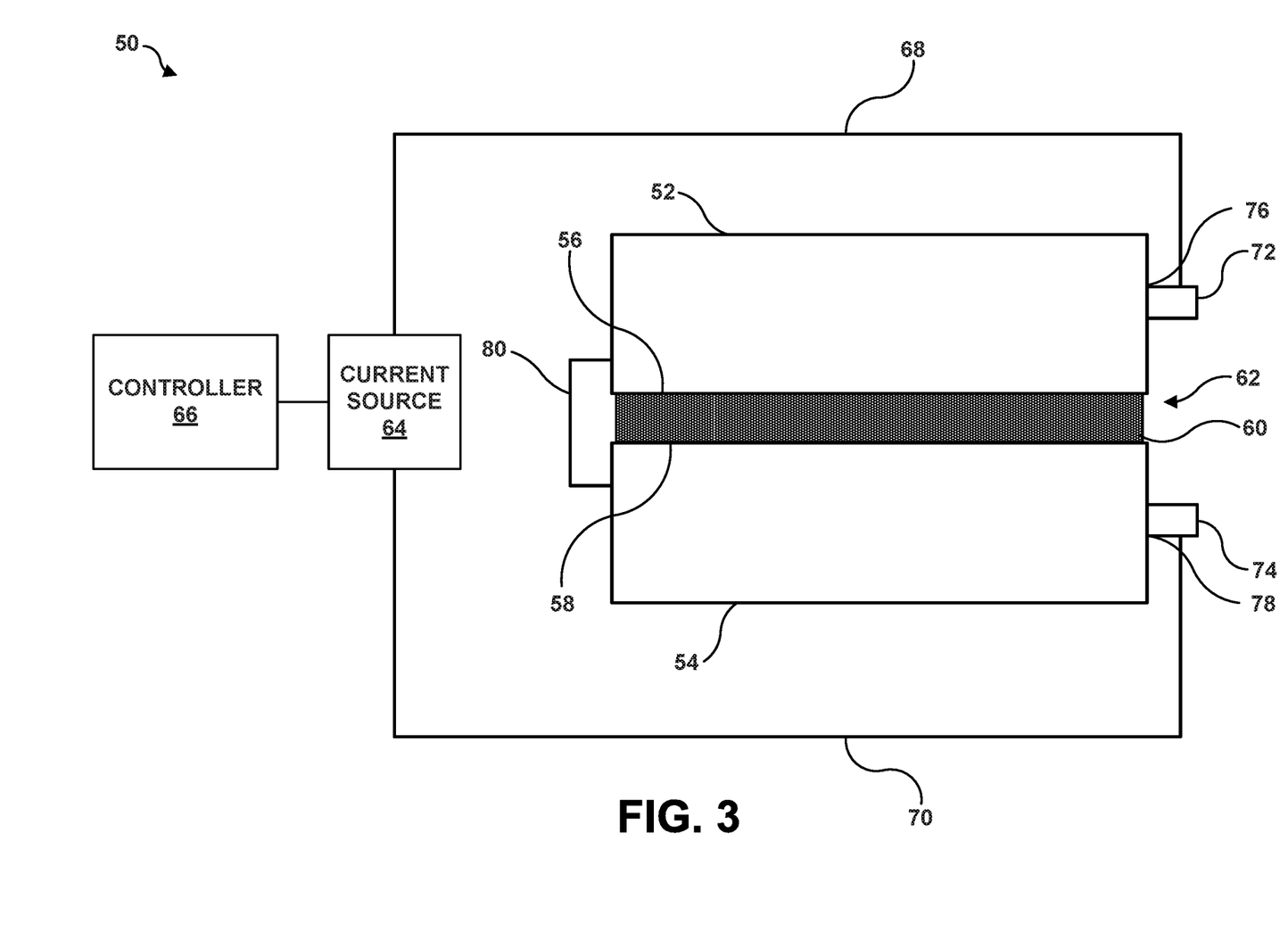
FIG. 3 is a conceptual and schematic diagram illustrating an example system for joining a first metal or alloy component and a second metal or alloy component using a metal or alloy powder by passing electric current in series through the first metal or alloy component to induce a magnetic field in the metal or alloy powder.

In some examples, rather than a current source 24 conducting electrical current through a powder to cause standing waves in the powder, a system may include a current source electrically connected to metal or alloy components in such a way that the current conducts through the metal or alloy components and induces eddy currents in a powder. For example, FIG. 3 is a conceptual and schematic diagram illustrating an example system 50 for joining a first metal or alloy component 52 and a second metal or alloy component 54 using a metal or alloy powder 60 by passing electric current in series through the first metal or alloy component 52 and then the second metal or alloy component 54 to induce a magnetic field in the metal or alloy powder 60. System 50 may include first metal or alloy component 52 having first major surface 56 and second metal or ally component 54 having second major surface 58. First major surface 56 and second major surface 58 may be positioned adjacent to each other to define joint region 62 between adjacent portions of the first major surface 56 and second major surface 58. Metal or alloy powder 60 may be disposed in at least a portion of joint region 62. Each of first metal or alloy component 52, second metal or alloy component 54, and metal or alloy powder 60 may be similar to or substantially corresponding component of system 10, aside from the differences described herein.

Controller 66 may control current source 64. First connection 68 and first electrode 72 with tip 76 may electrically couple first metal or alloy component 52 to current source 64, second connection 70 and second electrode 74 with tip 78 may electrically couple second metal or alloy component 54 to current source 64, and external electrical conductor 80 may electrically couple first component 52 to second metal or alloy component 54.

Rather than controller 26 being configured to cause current source 24 to output an electric current that passes from first component 12, through at least a portion of powder 20, into second component 14, controller 66 may be configured to cause current source 64 to output an electric current that passes through first metal or alloy component 52 adjacent to at least a first portion of the joint region 62, from first metal or alloy component 52 to second metal or alloy component 54 via external electrical conductor 80, and through second metal or alloy component 54 adjacent to at least the first portion of the joint region 62.

In some examples, controller 66 may be configured to cause current source 64 to output a high frequency alternating current. As the high frequency alternating current conducts through first metal or alloy component 52 and second metal or alloy component 54 adjacent to the first portion of joint region 62, the high frequency alternating current may induce magnetic eddy currents, magnetic hysteresis, or both, within at least a portion of metal or alloy powder 60. The characteristics of the high frequency alternating current, including the current amplitude, frequency, and signal duration may be selected to be sufficient to soften or melt at least a portion of metal or alloy powder 60 disposed in at least the first portion of joint region 62. For example, the high frequency alternating current passing through first metal or alloy component 52 adjacent to at least a first portion of the joint region 62 and passing through second metal or alloy component 54 adjacent to at least the first portion of the joint region 62 may cause an alternating magnetic field that penetrates at least a portion of metal or alloy powder 60 disposed in at least the first portion of joint region 62. The alternating magnetic field may cause electric currents, e.g., magnetic eddy currents, in at least the portion of metal or alloy powder 60 disposed in at least the first portion of joint region 62. The electric currents may heat metal or alloy powder 60 by Joule heating, e.g., by interactions of the moving particles (e.g., electrons) and atomic ions in metal or alloy powder 60.

In examples in which metal or alloy powder 60 may include at least some magnetic material, in addition to magnetic eddy currents, the alternating magnetic field may cause magnetic hysteresis. Magnetic hysteresis may cause hysteresis loss due to the irreversible magnetization in the magnetic field. For example, the alternating magnetic field applied in a first direction may cause the atomic dipoles of atoms of metal or alloy powder 60 to align with the alternating magnetic field. When the alternating magnetic field is reversed in a second, opposite direction, the magnetic flux density may decrease at a first nonlinear rate. When the field is again reversed in the first direction, the magnetic flux density may increase at a second, different nonlinear rate. The difference in the first rate and second rate may generate a hysteresis loop. The area of the hysteresis loop may define a hysteresis loss, e.g., power loss. The hysteresis loss may heat metal or alloy powder 60. In some examples, the alternating current amplitude and frequency may affect hysteresis loss. For example, hysteresis loss may increase for a greater amplitude compared to a lesser amplitude. As another example, hysteresis loss may increase for a lesser frequency compared to a greater frequency.

In some examples, the frequency of the alternating current may be selected based on the size (e.g., area, depth, or volume) of joint region 62; composition of any one of first metal or alloy component 52, second metal or alloy component 54, or metal or alloy powder 60; resistivity of metal or alloy powder 60, desired magnetic field penetration depth, or the like.

In this way, system 50 may be used to produce a joint having desirable mechanical and chemical properties without exposing first or second metal or alloy components 52 and 54 to undesirably long cycle times or prolonged, elevated temperatures. For example, selection of metal or alloy powder 60 may include a metal or alloy with desirable mechanical properties, chemical properties, or both, e.g., metal or alloy powder 60 may include reduced amounts of melting point depressants (e.g., B, Si, or the like) compared to braze alloys, to produce a joint with a higher melting temperature, reduced brittleness, or both, compared to joints formed using braze alloys or brazing techniques. As another example, using an alternating current that induces magnetic eddy currents, magnetic hysteresis, or both in at least a portion of metal or alloy powder 60 to soften or melt at least a portion of metal or alloy powder 60 may allow joining of first and second metal or alloy components 52 and 54 using metal or alloy powder 60 in a reduced amount of time, the resulting joint having improved mechanical strength and thermal stability, and with reduced impact on the microstructure of first and second metal or alloy components 52 and 54.

Figure 4:
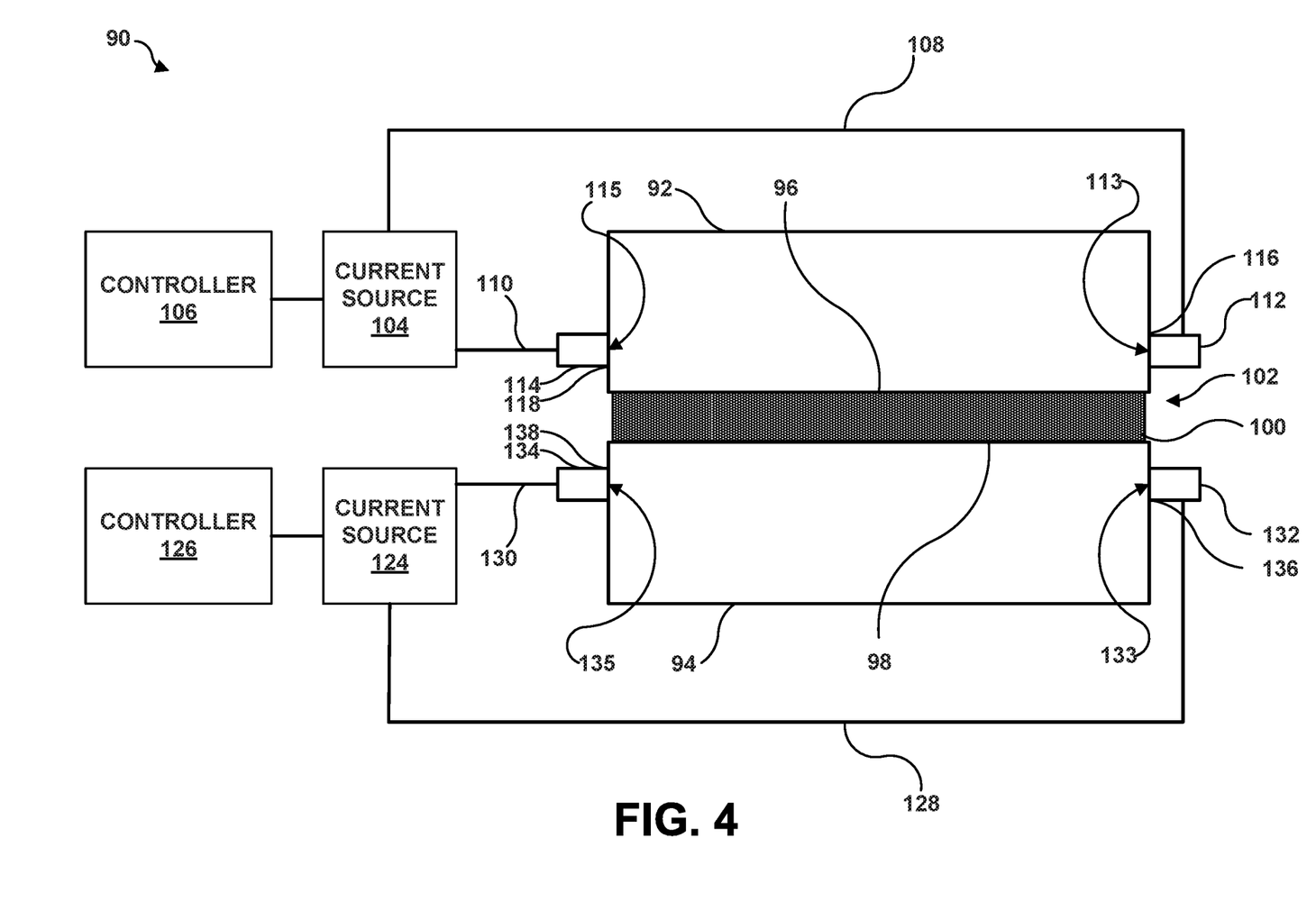
FIG. 4 is a conceptual and schematic diagram illustrating an example system for joining a first metal or alloy component and a second metal or alloy component using a metal or alloy powder by passing a first electric current through the first metal or alloy component in a first current loop and passing a second electric current through the second metal or alloy component in a second current loop to induce a magnetic field in the metal or alloy powder.

FIG. 4 is a conceptual and schematic diagram illustrating another example system for joining a first metal or alloy component and a second metal or alloy component using a metal or alloy powder by passing a first electric current through the first metal or alloy component in a first current loop and passing a second electric current through the second metal or alloy component in a second current loop to induce a magnetic field in the metal or alloy powder. In some examples, system 90 may include a first metal or alloy component 92 having first major surface 96 and a second metal or alloy component 94 having second major surface 98. First major surface 96 and second major surface 98 may be positioned adjacent to each other to define joint region 102 between adjacent portions of the first major surface 96 and second major surface 98. Metal or alloy powder 100 may be disposed in at least a portion of joint region 102. Each component of system 90 may be similar or substantially the same as the corresponding component of system 50, aside from the differences described herein.

In some examples, first controller 106 controls first current source 104. First connection 108 and first electrode 112 with tip 116 electrically couple first metal or alloy component 92 to first current source 104 at first position 113, and second connection 110 and second electrode 114 with tip 118 electrically couple first metal or alloy component 92 to first current source 104 at a second, different position 115.

In some examples, second controller 126 controls second current source 124. In some examples, third connection 128 and third electrode 132 with tip 136 may electrically couple second metal or alloy component 94 to second current source 124 at a third position 133, and fourth connection 130 and fourth electrode 134 with tip 138 may electrically couple second metal or alloy component 94 to second current source 104 at a fourth, different position 135. In other examples, a single controller may control both first current source 104 and second current source 124, first and second current sources 104 and 124 may be combined and output an electrical signal to first connection 108 and third connection 128 in parallel, or both.

Rather than controller 66 being configured to cause current source 64 to output an electric current that passes through first component 52 adjacent to at least a first portion of the joint region 62 from first component 52 to second component 54 via an external electrical conductor 80 and through second component 54 adjacent to at least the first portion of the joint region 62, first controller 106 may be configured to cause first current source 104 to output a first high frequency alternating current that passes from first position 113, through first metal or alloy component 92 adjacent to at least a first portion of joint region 102, and to second position 115. Similarly, second controller 126 may be configured to cause second current source 124 to output a second high frequency alternating current that passes from third position 133, through second metal or alloy component 94 adjacent to at least the first portion of joint region 102, to fourth position 135.

In some examples, controllers 106 and 126 may be configured to cause current sources 104 and 124 to output a first and second high frequency alternating current that may induce magnetic eddy currents, magnetic hysteresis, or both, within at least a portion of metal or alloy powder 100 sufficient to soften or melt at least a portion of powder 100 disposed in at least the first portion of the joint region 102. For example, the first high frequency alternating current passing through first metal or alloy component 92 adjacent to at least a first portion of the joint region 102 and the second high frequency alternating current passing through second metal or alloy component 94 adjacent to at least the first portion of the joint region 102 may cause an alternating magnetic field that penetrates at least a portion of metal or alloy powder 100 disposed in at least the first portion of the joint region 102 to cause magnetic eddy currents, magnetic hysteresis, or both in at least a portion of metal or alloy powder 100 disposed in at least the first portion of the joint region 102.

In this way, system 90 may be used to produce a joint having desirable mechanical and chemical properties without exposing first or second metal or alloy components 92 and 94 to undesirably long cycle times or prolonged, elevated temperatures. For example, selection of metal or alloy powder 100 may include a metal or alloy with desirable mechanical properties, chemical properties, or both, e.g., metal or alloy powder 100 may include reduced amounts of melting point depressants (e.g., B, Si, or the like) compared to braze alloys, to produce a joint with a higher melting temperature, reduced brittleness, or both, compared to joints formed using braze alloys or brazing techniques. As another example, using an alternating current that induces magnetic eddy currents, magnetic hysteresis, or both in at least a portion of metal or alloy powder 100 to soften or melt at least a portion of metal or alloy powder 100 may allow joining of first and second metal or alloy components 92 and 94 using metal or alloy powder 100 in a reduced amount of time, the resulting joint having improved mechanical strength and thermal stability, and with reduced impact on the microstructure of first and second metal or alloy components 92 and 94.

Figure 5:
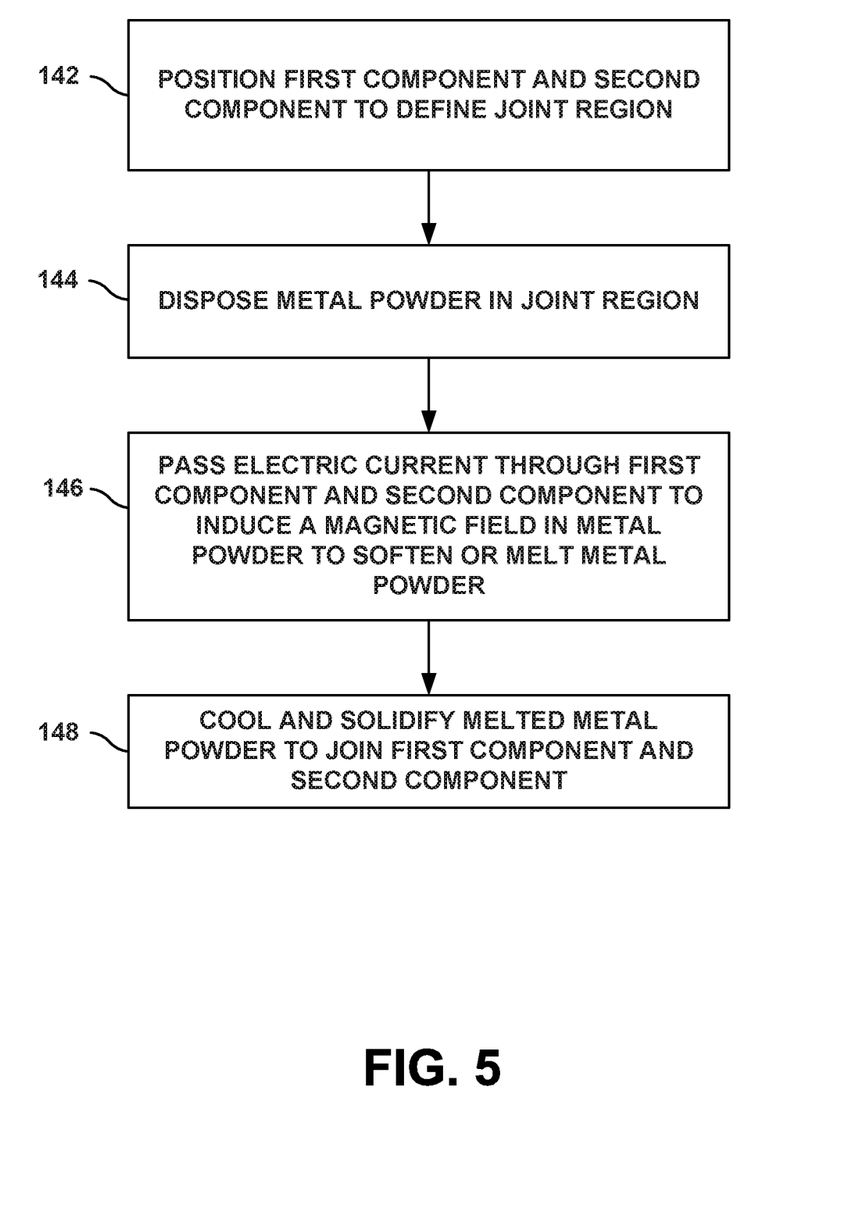
FIG. 5 is a flow diagram illustrating an example technique for joining a first metal or alloy component and a second metal or alloy component using a metal or alloy powder by passing electric current through the first metal or alloy component and the second metal or alloy component to induce a magnetic field in the metal or alloy powder.

FIG. 5 is a flow diagram illustrating an example technique for joining a first metal or alloy component and a second metal or alloy component using a metal or alloy powder by passing electric current through the first metal or alloy component and the second metal or alloy component to induce a magnetic field in the powder. The technique of FIG. 5 will be described with reference to system 50 of FIG. 3 and system 90 of FIG. 4 for purposes of illustration only. It will be appreciated that the technique of FIG. 5 may be performed with a different system, or that system 50 or system 90 may be used in a different joining technique.

Each step of the technique of FIG. 5 may be similar or substantially the same as the corresponding step in the technique of FIG. 2, aside from the differences described herein. The technique of FIG. 5 includes positioning first metal or alloy component 52 adjacent to second metal or alloy component 54 to define joint region 62 (142). The technique of FIG. 5 also includes disposing metal or alloy powder 60 in joint region 62 (144). Rather than passing electric current through powder 20 to soften or melt at least portion of powder 20 (46), the technique of FIG. 5 may include, with reference to FIG. 3, passing electric current through first metal or alloy component 52 and second metal or alloy component 54 to induce a magnetic field in metal or alloy powder 60 to soften or melt at least a portion of metal or alloy powder 60 (146). For example, controller 66 may be configured to cause current source 64 to output an electric current that passes through first metal or alloy component 52 adjacent to at least a first portion of the joint region 62, from first component 52 to second metal or alloy component 54 via an external electrical conductor 80, and through second metal or alloy component 54 adjacent to at least the first portion of the joint region 62 to induce magnetic eddy currents, magnetic hysteresis, or both, within at least a portion of metal or alloy powder 60 sufficient to soften or melt at least a portion of metal or alloy powder 60 disposed in at least the first portion of the joint region 62. In some examples, the induced magnetic eddy currents, magnetic hysteresis, or both, within metal or alloy powder 60 may heat at least a portion of metal or alloy powder 60. In some examples, controller 66 may control the heating by, for example, by controlling the voltage, amperage, frequency, waveform, duration, or the like of the electric current. In this way, the technique of FIG. 5 may use electric current to controllably soften or melt at least a portion of metal or alloy powder 60.

As another example, with reference to FIG. 4, first controller 106 may be configured to cause first current source 104 to output a first high frequency alternating current that passes from first position 113, through first metal or alloy component 92 adjacent to at least a first portion of joint region 102, and to second position 115, and second controller 126 may be configured to cause first current source 124 to output a second high frequency alternating current passes from third position 133, through second metal or alloy component 94 adjacent to at least the first portion of joint region 102, to fourth position 135 to induce magnetic eddy currents, magnetic hysteresis, or both, within at least a portion of metal or alloy powder 100. The magnetic eddy currents, magnetic hysteresis, or both, may be sufficient to soften or melt at least a portion of metal or alloy powder 100 disposed in at least the first portion of the joint region 102. In some examples, the induced magnetic eddy currents, magnetic hysteresis, or both, within metal or alloy powder 100, may heat at least a portion of metal or alloy powder 100. In some examples, first controller 106 and/or second controller 126 may control the heating by, for example, by varying the voltage, amperage, frequency, waveform, or the like of the first or second electric current. In this way, the technique of FIG. 5 may use electric current to controllably soften or melt at least a portion of metal or alloy powder 100.

The technique of FIG. 5 further includes cooling softened or melted metal or alloy powder 60 to a temperature below the melting point temperature of metal or alloy powder 60, e.g., an ambient temperature, to form a solid and join first and second metal or alloy components 52 and 54 (148)

The functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:
 a current source;
 a first component comprising a first metal or alloy and a first major surface, wherein the first component is electrically coupled to the current source;
 a second component comprising a second metal or alloy and a second major surface, wherein:
  the first major surface and the second major surface are positioned adjacent to each other to define a joint region between adjacent portions of the first major surface and the second major surface, and
  the second component is electrically coupled in series to the first component and the current source via an external electrical conductor;
 a metal or alloy powder disposed in at least a portion of the joint region; and
 a controller configured to cause the current source to output an alternating current that:
  conducts through the first component adjacent to at least a first portion of the joint region and through the second component adjacent to at least the first portion of the joint region, and
  induces magnetic eddy currents, magnetic hysteresis, or both within at least a portion of the metal or alloy powder disposed in at least the first portion of the joint region.

2. The system of claim 1, further comprising a first electrode electrically coupled to the current source and the first component and a second electrode electrically coupled to the current source and the second component, wherein the controller is further configured to control positions of the first and second electrodes relative to the respective first and second components.

3. The system of claim 1, further comprising at least one electrode electrically coupled to the current source and at least one of the first component or the second component, wherein the at least one electrode is configured to induce within the metal or alloy powder magnetic eddy currents, magnetic hysteresis, or both over a surface area greater than sixteen square millimeters as measured from the first major surface or the second major surface.

4. The system of claim 1, wherein the frequency of the alternating current is within a range from 1 kHz to 10 GHz.

5. The system of claim 1, wherein at least one of the first component and the second component comprises a nickel based superalloy or a titanium based alloy.

6. The system of claim 1, wherein the metal or alloy powder is free of a melting point depressant.

7. A method comprising:
  positioning a first component comprising a first metal or alloy and a first major surface, wherein the first component is electrically coupled to a current source, adjacent to a second component comprising a second metal or alloy and a second major surface, wherein the second component is electrically coupled in series to the first major component and the current source via an external electrical conductor, to define a joint region between adjacent portions of the first major surface of the first component and the second major surface of the second component;
  introducing a metal or alloy powder to at least a portion of the joint region; and
  controlling, by a controller, the current source to cause the current source to output an alternating current that:
    conducts through the first component adjacent to at least a first portion of the joint region and through the second component adjacent to at least the first portion of the joint region; and
    introduces magnetic eddy currents, magnetic hysteresis, or both within at least a portion of the metal or alloy powder in the at least first portion of the joint region.

8. The method of claim 7, further comprising:
  controlling, by the controller:
    a first position of a first electrode electrically coupled to the current source and the first component; and
    a second position of a second electrode electrically coupled to the current source and the second component.

9. The method of claim 8, wherein at least one electrode is configured to induce within the metal or alloy powder magnetic eddy currents, magnetic hysteresis, or both over a surface area greater than sixteen square millimeters as measured from the first major surface or the second major surface.

10. The method of claim 7, wherein the frequency of the alternating current is within a range from 1 kHz to 10 GHz.

11. The method of claim 7, wherein at least one of the first component and the second component comprises a nickel based superalloy or a titanium based alloy.

12. The method of claim 7, wherein the metal or alloy powder is free of a melting point depressant.

* * * * *